United States Patent
Datas et al.

(10) Patent No.: US 12,319,441 B2
(45) Date of Patent: Jun. 3, 2025

(54) REFERENTIAL POSITIONING DEVICE INTENDED TO POSITION RELATIVE TO EACH OTHER AT LEAST ONE CABIN FLOOR GRID AND ONE SIDE SHELL OF AN AIRCRAFT IN ORDER TO ASSEMBLE A FUSELAGE BARREL OF THE AIRCRAFT

(71) Applicants: AIRBUS OPERATIONS (S.A.S.), Toulouse (FR); AIRBUS OPERATIONS GmbH, Hamburg (DE)

(72) Inventors: Jean-Marc Datas, Toulouse (FR); Thomas Cartereau, Toulouse (FR); Jacques Bouriquet, Toulouse (FR); André Aquila, Blagnac (FR); Nicolas Darbonville, Blagnac (FR); Thomas Autret, Blagnac (FR); Joël Barboule, Toulouse (FR); Sébastien Bayonne, Toulouse (FR); Patrick Guerin, Toulouse (FR); Sjoerd Van Der Veen, Toulouse (FR); Ralph Titze, Hamburg (DE)

(73) Assignees: AIRBUS OPERATIONS (S.A.S.), Toulouse (FR); AIRBUS OPERATIONS GMBH, Hamburg (DE)

( * ) Notice: Subject to any disclaimer, the term of this patent is extended or adjusted under 35 U.S.C. 154(b) by 36 days.

(21) Appl. No.: 18/357,768

(22) Filed: Jul. 24, 2023

(65) Prior Publication Data
US 2024/0025560 A1   Jan. 25, 2024

(30) Foreign Application Priority Data
Jul. 25, 2022   (FR) .................................. 2207610

(51) Int. Cl.
B64F 5/10   (2017.01)
B64C 1/18   (2006.01)
B64F 5/50   (2017.01)

(52) U.S. Cl.
CPC .................. *B64F 5/10* (2017.01); *B64C 1/18* (2013.01); *B64F 5/50* (2017.01)

(58) Field of Classification Search
CPC .......... B64C 1/18; B64F 5/10; B23P 2700/01; Y10T 29/49622
See application file for complete search history.

(56) References Cited

U.S. PATENT DOCUMENTS 9,199,715 B2 * 12/2015 Koncz ....................... B64F 5/10
10,029,805 B2 * 7/2018 Pirro ....................... B25B 11/02
(Continued)

FOREIGN PATENT DOCUMENTS

FR   2788743 A1   7/2000
FR   3072656 A1   4/2019

OTHER PUBLICATIONS

French Search Report for Application No. FR 2207610 dated Feb. 17, 2023, 7 pages.

*Primary Examiner* — Michael W Hotchkiss
(74) *Attorney, Agent, or Firm* — Nixon & Vanderhye P.C.

(57) ABSTRACT

A referential positioning device configured to position relative to each other at least one cabin floor grid and one side shell of an aircraft in order to assemble a fuselage barrel of the aircraft is disclosed having at least one fixing support for fixing the referential positioning device to the top of an alignment post of an assembly platform, and a partially spherical support having a spherical surface (S) intended to receive the V-shaped surface of an end of an arm of a transport system for a cabin floor grid of an aircraft. The referential positioning device makes it possible to arrange (Continued)

the cabin floor grid precisely on the assembly platform with respect to the other elements of the fuselage barrel.

8 Claims, 4 Drawing Sheets

(56) References Cited

U.S. PATENT DOCUMENTS

| | | | | |
|---|---|---|---|---|
| 10,053,234 B2 * | 8/2018 | Durnad | ............... | B64C 1/061 |
| 10,967,988 B2 * | 4/2021 | Brindeau | ............... | B64F 5/10 |
| 12,049,330 B2 * | 7/2024 | Smith | ............... | B23P 19/04 |
| 2007/0226981 A1 * | 10/2007 | Craig | ............... | B23P 19/10 |
| | | | | 29/243.53 |
| 2011/0036946 A1 * | 2/2011 | Depeige | ............... | B64C 1/18 |
| | | | | 244/120 |
| 2017/0247101 A1 * | 8/2017 | Guering | ............... | B64C 1/20 |

* cited by examiner

REFERENTIAL POSITIONING DEVICE INTENDED TO POSITION RELATIVE TO EACH OTHER AT LEAST ONE CABIN FLOOR GRID AND ONE SIDE SHELL OF AN AIRCRAFT IN ORDER TO ASSEMBLE A FUSELAGE BARREL OF THE AIRCRAFT

CROSS REFERENCE TO RELATED APPLICATION

This application claims priority to French Application Number FR 2207610, filed Jul. 25, 2022, the entire contents of which is hereby incorporated by reference.

BACKGROUND

The present invention relates to a referential positioning device intended to position relative to each other at least one cabin floor grid and one side shell of an aircraft in order to assemble a fuselage barrel of the aircraft.

A fuselage barrel of an aircraft generally comprises a plurality of elements, in particular a cabin floor grid of the aircraft, a lower shell, two side shells and an upper shell. These elements are manufactured independently of one another, and the holes enabling them to be joined together are drilled before their assembly. Assembling these elements therefore requires the use of hole-to-hole and/or part-to-part assembly techniques in order to ensure that they are correctly aligned during assembly.

In order to facilitate the assembly of the fuselage barrel, the cabin floor grid has to be positioned precisely with respect to the other elements of the fuselage barrel. The solutions for positioning these two elements with respect to each other are not entirely satisfactory.

SUMMARY

The claimed invention encompasses a referential positioning device intended to position relative to each other at least one cabin floor grid and one side shell of an aircraft in order to assemble a fuselage barrel of the aircraft, the cabin floor grid being able to be transported by a transport system comprising two pairs of arms, each pair disposed at a longitudinal end of a rectangular spreader to which the cabin floor grid is able to be fixed, each arm of the two pairs of arms having an end with a V-shaped surface, the V-shaped surface having a first plane portion and a second plane portion extending away from each other to form a V, the fuselage barrel, after assembly, being linked to an orthogonal frame of reference defined by an axis X parallel to a longitudinal axis of the fuselage barrel, a horizontal axis Y and a vertical axis Z, the referential positioning device being configured to be used in cooperation with three other referential positioning devices.

According to an exemplary embodiment, the referential positioning device comprises at least:
- a first fixing support intended to fix the referential positioning device to the top of an alignment post of an assembly platform;
- a partially spherical support fixed to the first fixing support, the partially spherical support having at least in part a spherical surface with a center, the spherical surface being intended to receive the V-shaped surface of one end of an arm of the transport system.

Thus, by virtue of the spherical surface of the referential positioning device and the V-shaped surface of the end of the arm of the transport system, the position of the cabin floor grid is fixed precisely in order to facilitate assembly of the other elements of the fuselage barrel.

According to an exemplary embodiment, the spherical surface is intended to come into contact with the first plane portion and the second plane portion of the V-shaped surface respectively at a first contact zone of the first plane portion and a second contact zone of the second plane portion, a first normal to the first plane portion of the V-shaped surface at the level of the first contact zone and a second normal to the second plane portion of the V-shaped surface at the level of the second contact zone intersecting at the center of the spherical surface when the spherical surface comes into contact with the first plane portion and the second plane portion of the V-shaped surface.

According to an exemplary embodiment, the referential positioning device also comprises a referential pin fixed to the partially spherical support, the referential pin protruding from the spherical surface, the referential pin having a longitudinal axis parallel to the axis Y and passing through the center of the spherical surface, the referential pin being intended to receive a notch arranged at the end of the arm of the transport system.

Furthermore, the referential positioning device additionally comprises a rod passing diametrically all the way through the partially spherical support, the rod having a longitudinal axis parallel to the axis X and passing through the center of the spherical surface, the rod having two ends protruding from either side of the spherical surface, the two ends of the rod each being intended to receive a tooth of an end of a two-toothed fork of a device for positioning a side shell, to which device a side shell is fixed.

Advantageously, the rod is movable in translation along the axis X with respect to the partially spherical support.

Moreover, the rod is also movable in translation about its longitudinal axis.

In addition, the two ends of the rod each comprise a groove, each groove intended to receive a tooth of the end of the fork.

BRIEF DESCRIPTION OF THE DRAWINGS

For an understanding of embodiments of the disclosure, reference is now made to the following description taken in conjunction with the accompanying drawings.

DETAILED DESCRIPTION

Some embodiments will now be described with reference to the Figures.

In the description below, the adjective "vertical" and the adverb "vertically" are used with reference to the direction of gravity. The adjective "horizontal" and the adverb "horizontally" are used with reference to a direction perpendicular to the direction of gravity.

Figure 1:
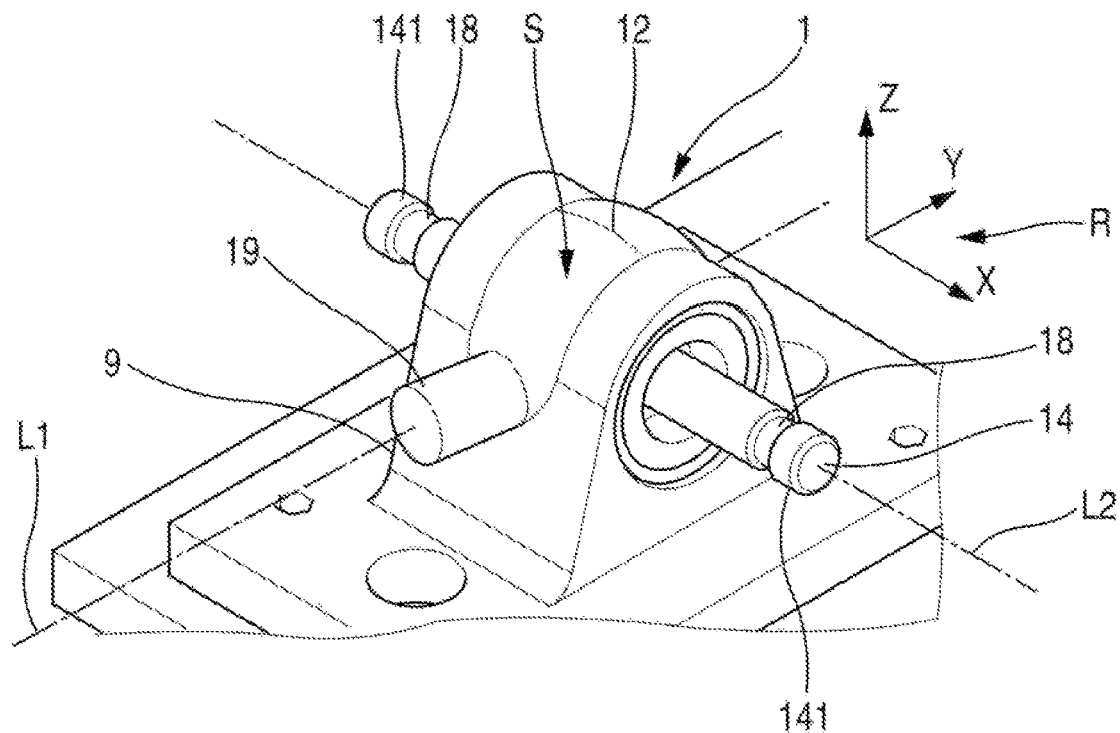
FIG. 1 is a perspective view of the referential positioning device according to an exemplary embodiment.
Figure 7:
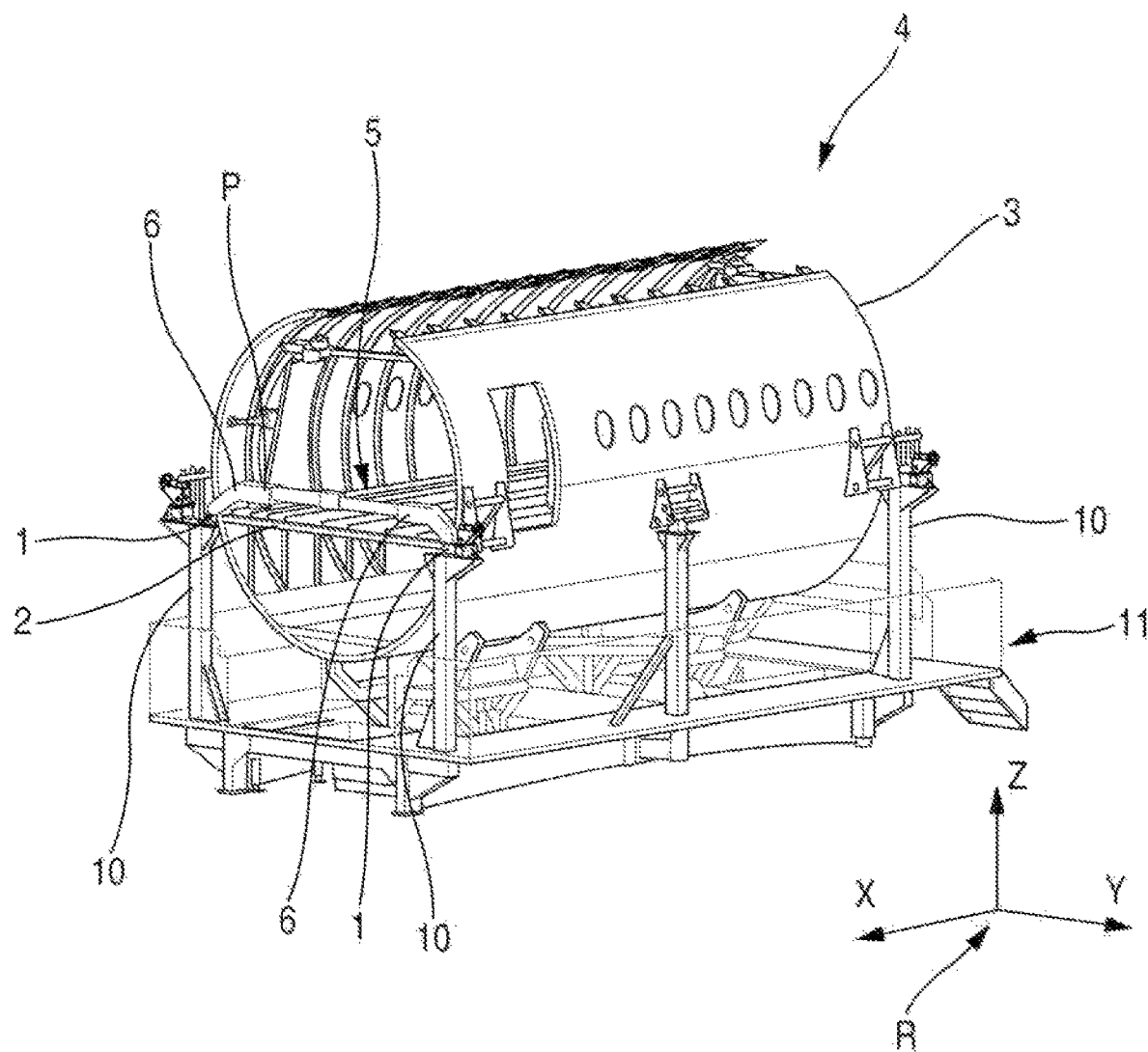
FIG. 7 is a perspective view of an assembly platform on which a fuselage barrel is assembled and which comprises alignment posts, at the tops of which referential positioning devices are fixed.

The referential positioning device 1 is shown in FIG. 1. The referential positioning device 1 is intended to position relative to each other at least one floor grid 2 and two side shells 3 of an aircraft AC in order to assemble a fuselage barrel 4 of the aircraft AC (FIG. 7). By way of non-limiting example, the floor grid 2 can be a cabin floor grid, a cockpit floor grid, a floor grid of a hold, or any other floor grid.

Figure 5:
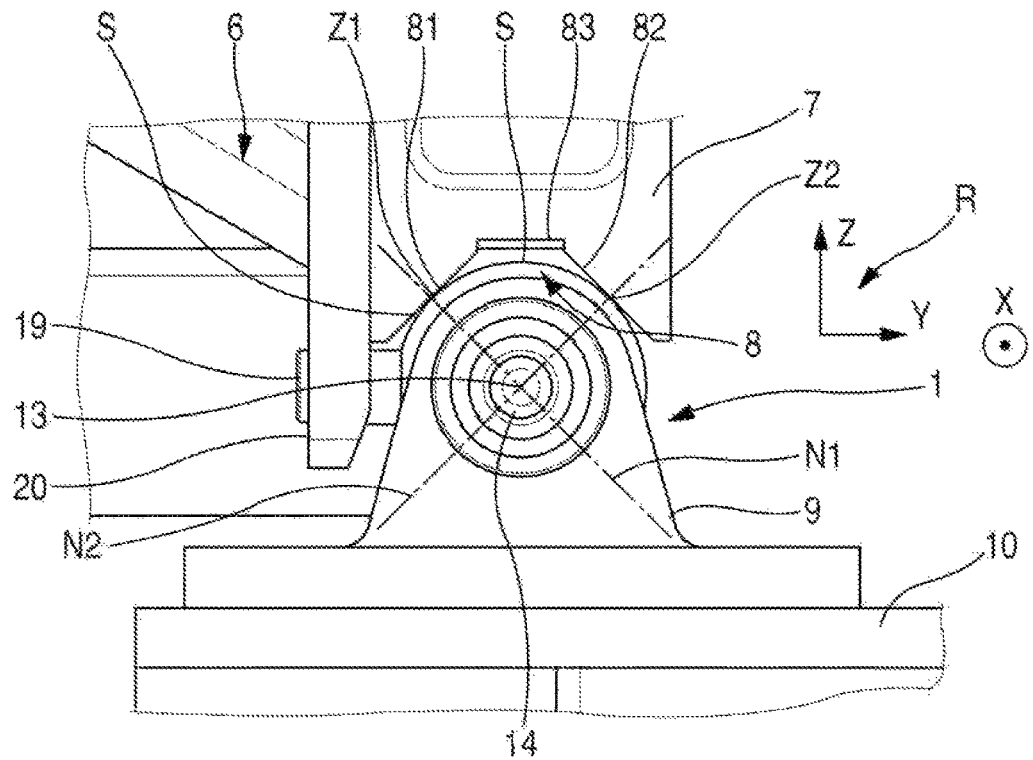
FIG. 5 is a view, on a plane parallel to the axes Y and Z, of the referential positioning device, on which is placed the end of an arm of a system for transporting a cabin floor grid.

The floor grid 2 is able to be transported by a transport system 5 comprising two pairs of arms 6, each pair disposed at a longitudinal end of a rectangular spreader P. The floor grid 2 is able to be fixed to the rectangular spreader P. Each arm 6 of the two pairs of arms has an end 7 able to comprise a V-shaped surface 8 which has a first plane portion 81 and a second plane portion 82 extending away from each other to form a V. FIG. 5 shows the V-shaped surface 8 in one embodiment. In this embodiment, the V shape comprises the first plane portion 81, the second plane portion 82, and a third plane portion 83 connecting the first plane portion 81 and the second plane portion 82. The third plane portion 83 is perpendicular to the bisector of the angle formed by the first plane portion 81 and the second plane portion 82.

The fuselage barrel 4, after its assembly, is linked to an orthogonal frame of reference R defined by an axis X parallel to a longitudinal axis of the fuselage barrel 4, a horizontal axis Y and a vertical axis Z.

The referential positioning device 1 is configured to be used in cooperation with three other referential positioning devices 1.

Figure 2:
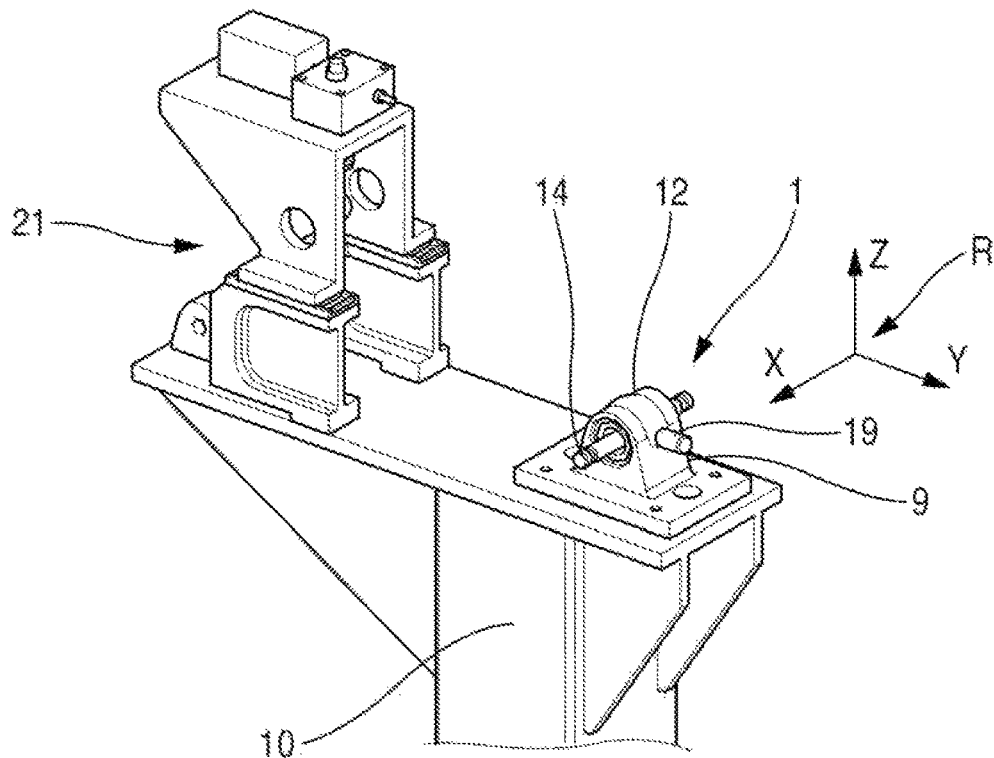
FIG. 2 is a perspective view of the referential positioning device and of a fork rotation module.
Figure 3:
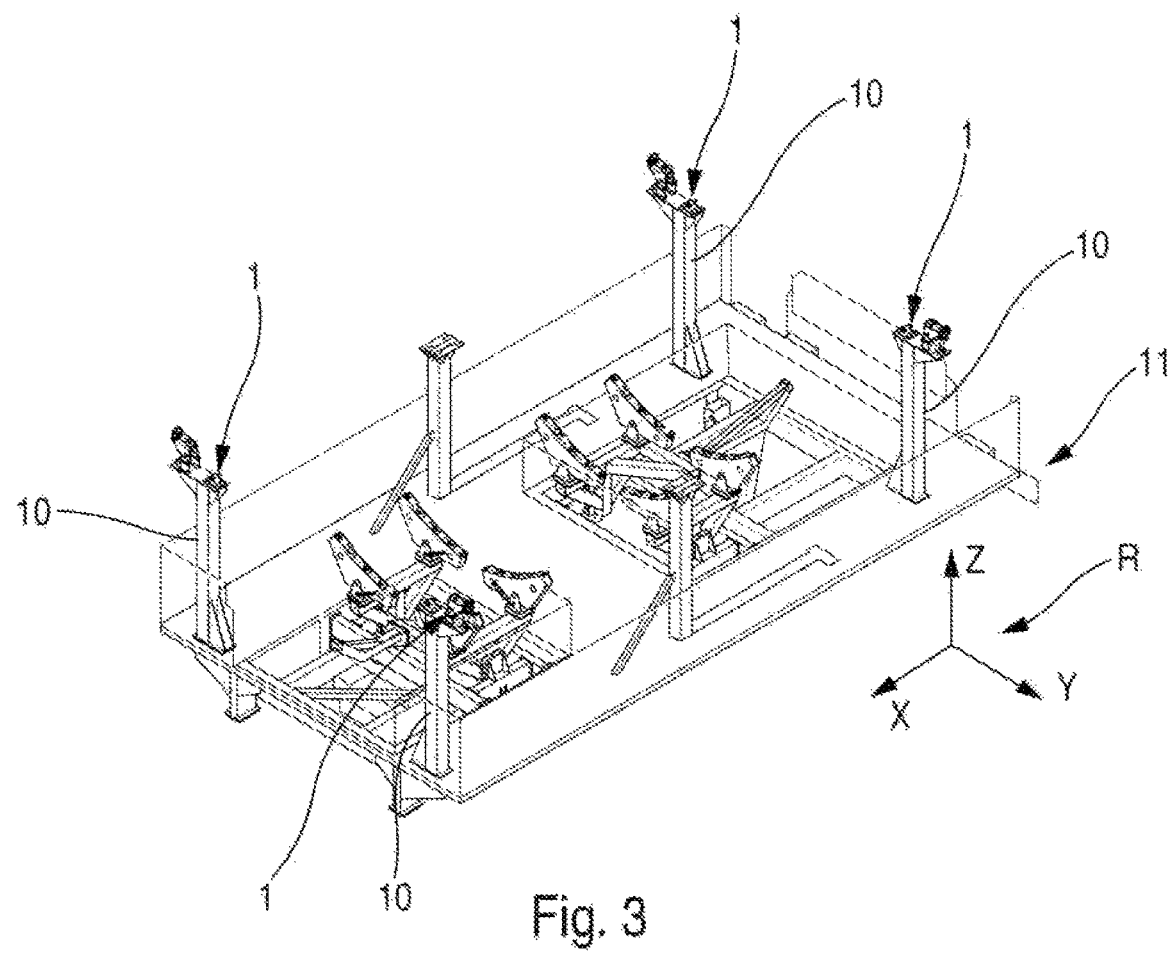
FIG. 3 is a perspective view of an assembly platform comprising alignment posts, at the tops of which referential positioning devices are fixed.

As is shown in FIG. 2 and FIG. 3, the referential positioning device 1 comprises at least a first fixing support 9 intended to fix the referential positioning device 1 to the top of an alignment post 10 of an assembly platform 11. For example, the fixing support 9 can comprise openings through which screws can be passed in order to screw the referential positioning device 1 to the top of an alignment post 10.

The referential positioning device 1 also comprises a partially spherical support 12 fixed to the first fixing support 9. This partially spherical support 12 has at least in part (of the surface of the partially spherical support 12) a spherical surface S having a center 13. The spherical surface S is intended to receive the V-shaped surface 8 of an end 7 of an arm 6 of the transport system 5.

When the referential positioning device 1 is used in cooperation with three other referential positioning devices 1, the spherical surface S of each of the three other referential positioning devices 1 is also intended to receive the V-shaped surface 8 of the end 7 of the other arms 6 of the transport system 5.

Advantageously, the spherical surface S is intended to come into contact with the first plane portion 81 and the second plane portion 82 of the V-shaped surface 8. The spherical surface S is intended to come into contact with a first contact zone Z1 of the first plane portion 81 and with a second contact zone Z2 of the second plane portion 82. The first contact zone Z1 and the second contact zone Z2 can be a point (FIG. 5).

The first normal N1 to the first plane portion 81 of the V-shaped surface 8 at the level of the first contact zone Z1 and the second normal N2 to the second plane portion 82 of the V-shaped surface 8 at the level of the second contact zone Z2 intersect substantially at the center 13 of the spherical surface S when the spherical surface S comes into contact with the first plane portion 81 and the second plane portion 82 of the V-shaped surface 8 (FIG. 5).

Figure 4:
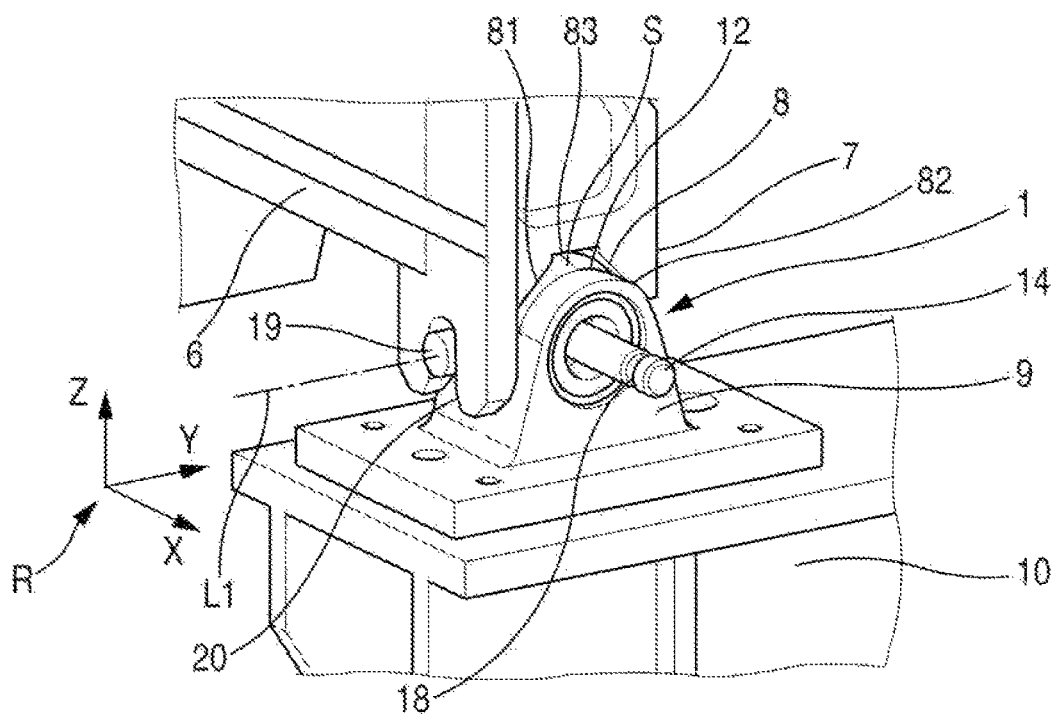
FIG. 4 is a perspective view of a referential positioning device on which is placed the end of an arm of a system for transporting a cabin floor grid.

Furthermore, the referential positioning device 1 can also comprise a referential pin 19 fixed to the partially spherical support 12. The referential pin 19 protrudes from the spherical surface S. The referential pin 19 has a longitudinal axis L1 parallel to the axis Y and passing through the center of the spherical surface. The referential pin 19 is intended to receive a notch 20 arranged at the end 7 of an arm 6 of the transport system 5, as is shown in FIG. 4 and FIG. 5. The referential pin 19 can have a cylindrical shape. The notch 20 then has a partially cylindrical shape which at least in part complements the cylindrical shape of the referential pin 19. The partially cylindrical shape of the notch 20 comprises a longitudinal axis intended to be parallel to the longitudinal axis L1 of the referential pin 19. The referential pin 19 makes it possible to ensure that the V-shaped surface is positioned in such a way that the first contact zone Z1 and the second contact zone Z2 are included in a diametral plane of the spherical surface S (passing through the center 13 of the spherical surface S).

Figure 6:
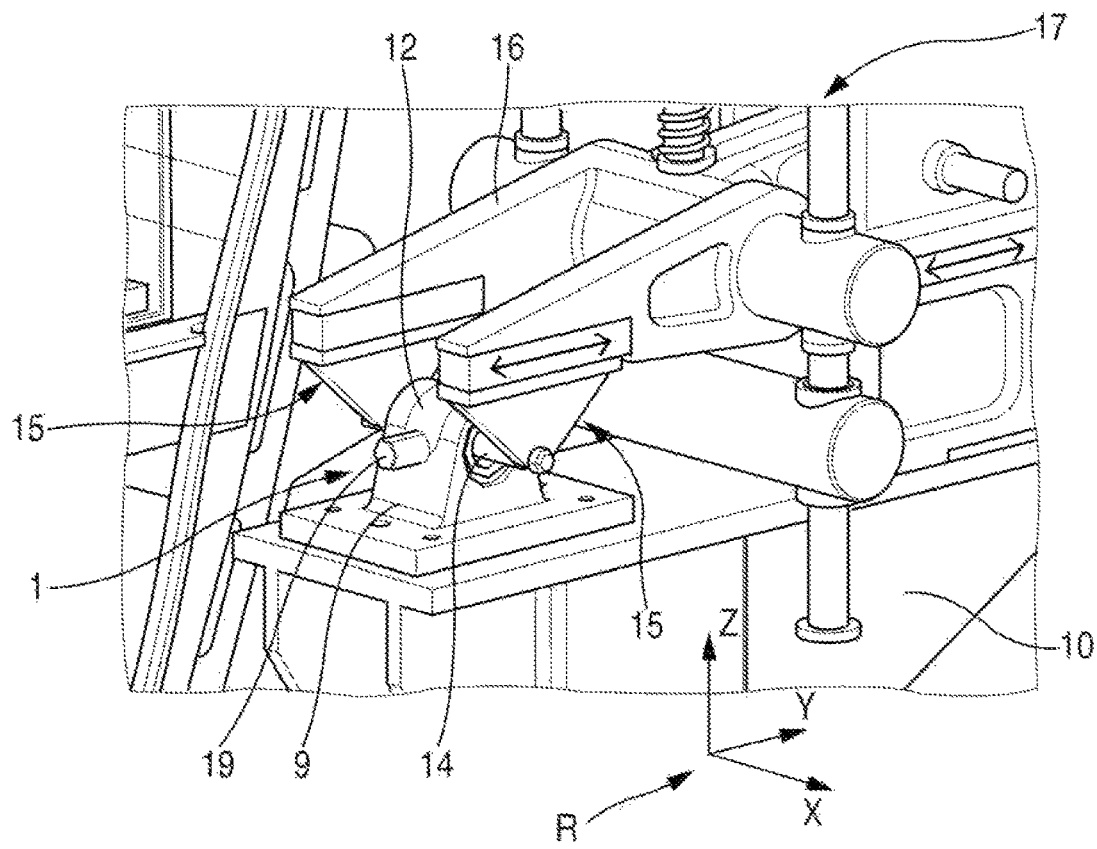
FIG. 6 is a perspective view of the referential positioning device on which is placed the end of a fork.

The referential positioning device 1 can additionally comprise a rod 14 which passes diametrically all the way through the partially spherical support 12. The rod 14 has a longitudinal axis L2 parallel to the axis X and passing through the center 13 of the spherical surface S. The longitudinal axis L2 is perpendicular to the longitudinal axis L1. The rod 14 has two ends 141 protruding from either side of the spherical surface S. The two ends 141 of the rod 14 are each intended to receive a tooth 15 of an end of a fork 16 that has two teeth 15 of a device 17 for positioning a side shell 3, to which device a side shell 3 is fixed (FIG. 6). The other end of the fork 16 can be received by a rotation module 21 of the fork 16 fixed to the top of the alignment post 10 on which the referential positioning device 1 is intended to be fixed (FIG. 2).

Advantageously, the rod 14 is movable in translation along the axis X with respect to the partially spherical support 12. Thus, the fork 16 can move in translation along the axis X. Moreover, the rod 14 can also be movable in rotation about its longitudinal axis L1. Thus, the fork can be movable in rotation about the axis L1.

The two ends 141 of the rod 14 can each comprise a groove 18, each groove 18 intended to receive a tooth 15 of the end of the fork 16. These grooves 18 make it possible to avoid the teeth 15 of the fork 16 slipping on the rod 14 along the axis X. Thus, the fork 16 and the rod 14 move jointly in translation along the axis X when the teeth 15 of the fork 16 are each inserted in a groove 18 of the rod 14.

By virtue of the rod 14, which receives an end of a fork 16 of a device 17 for positioning a side shell 3, and by virtue of the spherical surface S and also the referential pin 19, it is ensured that the floor grid 2 and the one or more side shells 3 are positioned precisely with respect to one another in order to facilitate assembly of the fuselage barrel 4.

The spherical surface S makes it possible to block the position of the V-shaped surface 8 of each arm 6 of the rectangular spreader P along the axis Y and the axis Z. The referential pin 19 makes it possible to block the position of the V-shaped surface along the axis X.

The grooves 18 at the ends 141 of the rod 14 make it possible to block the position of the fork 16 of the device 17 for positioning the side shell 3 along the axis Y and the axis Z. The rod 14 being able to move in translation along the axis X, the fork 16 is able to move freely along the axis X. The movement along the axis X authorizes the placement of the side shells 3 with respect to the floor grid 2. In addition, the fork 16 can enter into rotation about the rod 14 along an axis parallel to the axis X. This rotation is able to facilitate hole-to-hole assembly and/or part-to-part assembly between the side shells 3 and the upper shell of a fuselage.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A referential positioning device configured to position relative to each other at least one cabin floor grid and one side shell of an aircraft (AC) in order to assemble a fuselage barrel of the aircraft, the cabin floor grid being able to be transported by a transport system comprising two pairs of arms, each pair disposed at a longitudinal end of a rectangular spreader (P) to which the cabin floor grid is able to be fixed, each arm of the two pairs of arms having an end with a V-shaped surface, the V-shaped surface having a first plane portion and a second plane portion extending away from each other to form a V, the fuselage barrel, after assembly, being linked to an orthogonal frame of reference (R) defined by an axis X parallel to a longitudinal axis of the fuselage barrel, a horizontal axis Y and a vertical axis Z, the referential positioning device being configured to be used in cooperation with three other referential positioning devices,
wherein a first fixing support is configured to fix the referential positioning device to the top of an alignment post of an assembly platform;
a partially spherical support fixed to the first fixing support, the partially spherical support having at least in part a spherical surface (S) with a center, the spherical surface (S) being intended to receive the V-shaped surface of an end of an arm of the transport system,
the referential positioning device further comprising a rod passing diametrically all the way through the partially spherical support, the rod having a longitudinal axis (L2) parallel to the axis X and passing through the center of the spherical surface (S), the rod having two ends protruding from either side of the spherical surface (S), the two ends of the rod each being intended to receive a tooth of an end of a fork that has two teeth of a device for positioning a side shell, to which device a side shell is fixed.

2. The device as claimed in claim 1, the spherical surface (S) is configured to come into contact with the first plane portion and the second plane portion of the V-shaped surface (8) respectively at a first contact zone (Z1) of the first plane portion and a second contact zone (Z2) of the second plane portion, a first normal (N1) to the first plane portion of the V-shaped surface at the level of the first contact zone (Z1) and a second normal (N2) to the second plane portion of the V-shaped surface at the level of the second contact zone (Z2) intersecting at the center of the spherical surface (S) when the spherical surface (S) comes into contact with the first plane portion and the second plane portion of the V-shaped surface.

3. The device as claimed in claim 1, further comprising a referential pin fixed to the partially spherical support, the referential pin protruding from the spherical surface (S), the referential pin having a longitudinal axis (L1) parallel to the axis Y and passing through the center of the spherical surface (S), the referential pin being intended to receive a notch arranged at the end of the arm of the transport system.

4. The device as claimed in claim 1, wherein the rod is movable in translation along the axis X with respect to the partially spherical support.

5. The device as claimed in claim 1, wherein the rod is movable in rotation about its longitudinal axis (L1).

6. The device as claimed in claim 1, wherein the two ends of the rod each comprises a groove, each groove intended to receive a tooth of the end of the fork.

7. A method of positioning at least one cabin floor grid and one side shell of an aircraft relative to one another during an assembly of an aircraft fuselage using the device of claim 1.

8. A device for positioning at least one cabin floor grid relative to one side shell of an aircraft during an assembly of a fuselage, comprising:
a rectangular spreader,
a transport system comprising two pairs of arms, wherein each pair of arms is disposed at a longitudinal end of the rectangular spreader,
wherein each arm further includes a first end having a V-shaped surface with a first plane portion and a second plane portion extending away from,
wherein the fuselage is linked to an orthogonal frame of reference defined by an axis X parallel to a longitudinal axis of the fuselage, a horizontal axis Y and a vertical axis Z,
a first fixing support configured to fix the referential positioning device to an alignment post of an assembly platform,
a partially spherical support having a center and a partial spherical surface (S), fixed to the first fixing support, wherein the partial spherical surface (S) is configured to receive the V-shaped surface,
a rod having a longitudinal axis parallel to the axis X, passing diametrically through the partially spherical support,
wherein a first end and second end of the rod protrude from either side of the partial spherical surface (S), and
wherein first and second ends the rod are configured to receive a tooth of an end of a fork having two teeth of a device for positioning a side shell, to which device a side shell is fixed.

* * * * *